May 9, 1939.  E. HUBEL  2,157,823
HIGH VOLTAGE MEASUREMENT MEANS
Filed Feb. 8, 1938
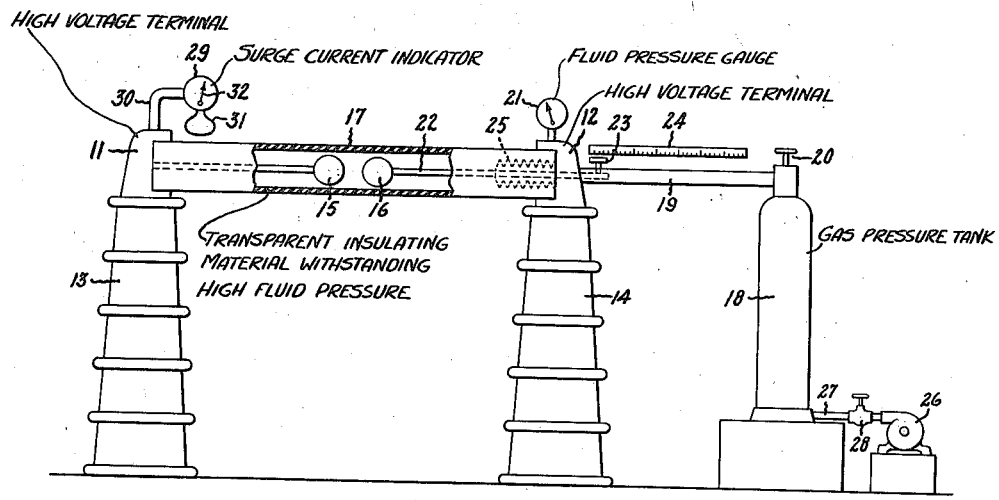
Inventor:
Eugen Hubel,
by Harry E. Dunham
His Attorney.

Patented May 9, 1939

2,157,823

UNITED STATES PATENT OFFICE 2,157,823

HIGH VOLTAGE MEASUREMENT MEANS

Eugen Hubel, Berlin, Germany, assignor to General Electric Company, a corporation of New York Application February 8, 1938, Serial No. 189,428
In Germany February 17, 1937

2 Claims. (Cl. 171—95)

My invention relates to voltage measuring methods and apparatus and concerns particularly arrangements of the spark gap type.

It is an object of my invention to provide an improved flash-over type voltage measuring device in which relatively small electrodes and relatively short spacings may be employed in order to obtain compactness.

Other and further objects and advantages will become apparent as the description proceeds.

In accordance with my invention in its preferred form I provide a pair of spherical electrodes between which a voltage flash-over may take place to indicate the magnitude of the voltage and I enclose the electrodes in an insulating chamber preferably under high pressure. By use of high pressure the spacings between the electrodes for a given voltage and also the diameter of the spheres may be much smaller than in the case of electrodes in the open air. This arrangement results in a considerable saving of space, not alone because the apparatus itself is more compact, but also because the necessary spacing from other apparatus may be reduced.

The invention may be understood more readily from the following detailed description when considered in connection with the accompanying drawing and those features of the invention which are believed to be novel and patentable will be pointed out in the claims appended hereto. The single figure of the drawing is a side elevation with a portion thereof broken away showing one embodiment of my invention.

In the arrangement illustrated, two terminals 11 and 12 to which the voltage to be measured may be applied are mounted upon a pair of insulators 13 and 14. A pair of electrodes 15 and 16, preferably spherical, are electrically connected to the terminals 11 and 12 and are enclosed in a pressure chamber formed by a tube 17 of insulating material. Suitable means are provided for maintaining high pressure within the tube 17 for example, a pressure tank 18 communicating with the space within the tubular chamber 17 through tubing 19, preferably insulated, may be provided. The tank 18 may be filled with air or other suitable gas preferably under higher pressure than is needed in the chamber 17 in order that repeated tests under varying pressure may be made or leakage may be compensated for. In order to control the pressure within the chamber 17 a valve 20 at the outlet of the tank 18 may be provided. If desired, the valve 20 may be a three-way valve of a type well-known in the art having a normal position closing the connection between the tank and the communicating tube 19, having a second position for admitting gas under pressure to the chamber 17 to increase the pressure therein and a third position for bleeding air or gas from the chamber 17 to reduce the pressure therein. For measuring and controlling the pressure within the chamber 17 a pressure gage 21 may be provided.

I have found Pasch's law to be satisfactorily fulfilled by tests made upon my apparatus. That is, for any given break-down or flash-over voltage between the electrodes 15 and 16, the product of the spacing between the electrodes 15 and 16, and the pressure within the chamber 17 is found to be constant. Accordingly, by maintaining a relatively high pressure in chamber 17, high voltages may be measured by observing the spacing between the electrodes 15 and 16 at which flash-over results. In order to make measurements in this manner one of the electrodes, for example, electrode 16 may be adjustably mounted by securing it to a slidable rod 22 having a set screw 23 for securing it in various positions and a scale 24 may be provided for measuring the displacement of the electrode 16 to determine spacing between electrodes 15 and 16. It will be understood that a suitable seal between the opening in the terminal 12 through which the rod 22 protrudes is to be provided. For example, an accordion seal 25 may be utilized. It will be understood that the pressure admitting tube 19 is connected to the inside of the terminal 12 in front of the outlet for the rod 22 to avoid interfering with the seal. For facilitating observation of the occurrence of a flash-over, the insulating tube 17 may be composed of transparent material, or if desired an instrument for detecting flash-over may be provided. For example, an electric surge indicating instrument 29 mounted upon a bracket 30, carried by the terminal 11, may be inductively coupled to the circuit of the electrodes 15 and 16 by a loop 31. Upon discharge between the electrodes 15 and 16 the needle 32 will deflect momentarily.

Although I have found that satisfactory and convenient measurements may be made by measuring the various displacements of electrodes 15 and 16 it will be understood that my invention is not limited to this arrangement but, if desired, a constant spacing may be maintained and the pressure may be varied. In this case the pressure readings upon the gage 21 at which voltage flash-over takes place will be proportional to the voltage to be measured. If desired, the gage 21 may be calibrated in terms of voltage. Likewise, to extend the range of the apparatus both the spacing of the electrodes and the pressure in chamber 17 may be varied, in which case the voltage is readily determined by applying Pasch's law. In order to make up for loss of pressure when making measurements at varying pressures a pump 26 may be provided. The pump 26 may be connected to a suitable portion of the apparatus such as the tube 19 or the pressure tank 18 in any suitable manner as by a tube 27 having a stop cock 28 therein.

The voltage between the terminals 11 and 12 may be measured by moving the electrodes 15 and 16 together until flash-over takes place or by reducing the pressure in the chamber 17 until flash-over takes place. The spacing and pressure at which flash-over takes place may then be measured.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A voltage measuring apparatus comprising a pressure chamber, a pair of electrodes therein, means for measuring the pressure in the chamber, a surge current indicator and a circuit for inductively coupling the indicator to the discharge circuit of the electrodes 2. A voltage measuring apparatus comprising a pressure chamber, a pair of electrodes therein, and indicating means electrically responsive to an electrical discharge between said electrodes for indicating the occurrence of break down between the electrodes.

EUGEN HUBEL.